United States Patent [19]

Kiyokawa et al.

[11] 4,239,020
[45] Dec. 16, 1980

[54] HOUSE AND METHOD FOR LIVESTOCK RAISING

[75] Inventors: Shin Kiyokawa, Sohka; Shokichi Sakaguchi, Misato, both of Japan

[73] Assignee: Misato Plaheat Mfg. Ltd., Sohka, Japan

[21] Appl. No.: 30,642

[22] Filed: Apr. 16, 1979

[30] Foreign Application Priority Data

Feb. 22, 1979 [JP] Japan .................................. 54/20138

[51] Int. Cl.³ ........................... A01K 1/00; F24F 7/06
[52] U.S. Cl. ....................................... 119/16; 119/28; 98/40 D
[58] Field of Search ........................ 119/16, 20, 28, 33; 237/69, 46; 98/40 D, 33 R; 219/345

[56] References Cited

U.S. PATENT DOCUMENTS

| | | | |
|---|---|---|---|
| 2,859,504 | 1/1975 | Motokawa et al. | 219/345 |
| 3,181,503 | 5/1965 | Tripp | 119/20 |
| 3,584,603 | 6/1971 | Rutherford | 119/16 |
| 3,677,229 | 7/1972 | Blough et al. | 119/16 |
| 3,694,222 | 9/1972 | Pardoel et al. | 119/16 X |
| 3,951,336 | 4/1976 | Miller et al. | 119/16 X |

*Primary Examiner*—Hugh R. Chamblee
*Attorney, Agent, or Firm*—Armstrong, Nikaido, Marmelstein & Kubovcik

[57] ABSTRACT

A method of promoting growth of a great number of livestock individuals to the prescribed average weight in a substantially closed house, within a reduced period of time and consumption of feed, at an enhanced rate of survival and at a suppressed degree of variation in the individual growth, which comprises heating the house floor from below and controlling the floor temperature to be substantially constant throughout the floor area, and effecting ventilation across the house substantially without generation of any noise by delivering outdoor air taken in through an intake opening substantially evenly into the house and discharging the air within the house by natural exhaust through an exhaust window. A livestock house for practice of the method is also disclosed.

6 Claims, 15 Drawing Figures

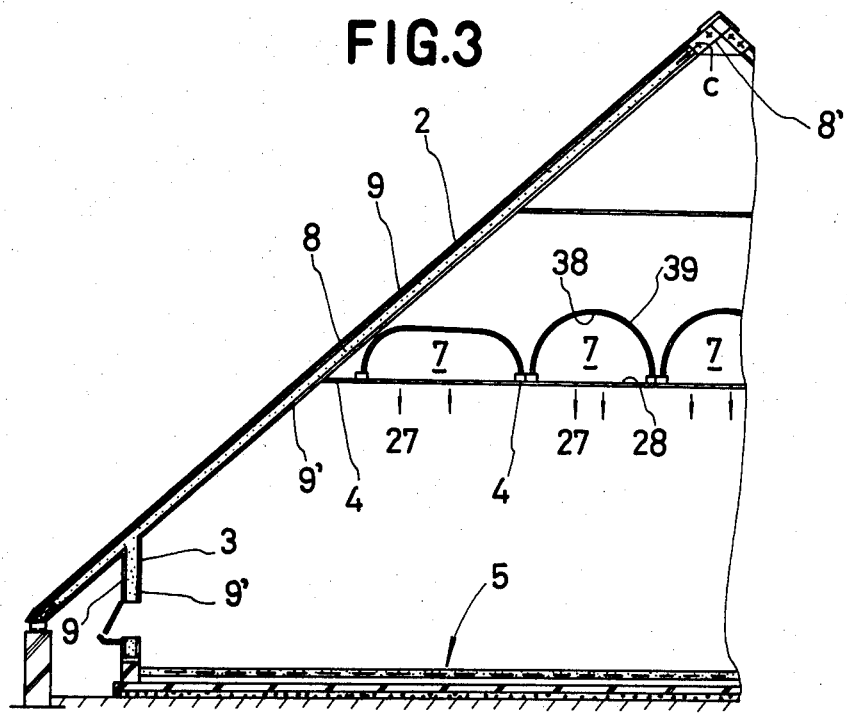
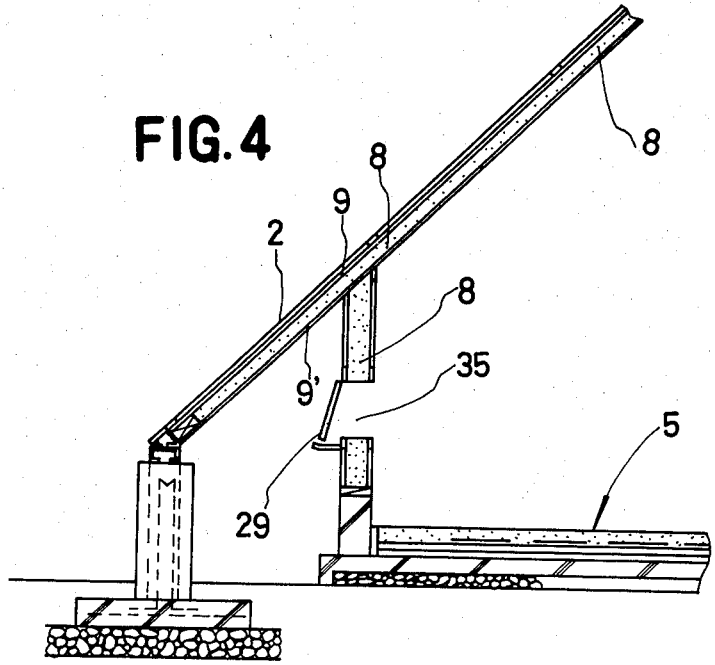

HOUSE AND METHOD FOR LIVESTOCK RAISING

BACKGROUND OF THE INVENTION

The present invention relates, in general, to a house for raising livestock and, in particular, an improved house for raising domestic animals and poultry for market, at an improved efficiency.

The term "livestock" is herein employed to mean both domestic animals and fowls, particularly those bred and raised in a great number of individuals for the meat market, for example such as hogs and chickens typically.

In the case of fowl raising, it is required that the young of fowl are raised to exceed a prescribed value of their average weight within a shorter period of time, at a reduced rate of their accidental death and with their inter-individual variation for example in weight suppressed as much as possible, as well as their consumption of feed.

Whereas the method of fowl farming and houses for the practice thereof have been variously developed since long before, in recent years in particular it has grown to be of public interest to raise chickens for the flesh market in a certain great number of individuals and under certain limited conditions relating to the period of time and space for raising, and so forth.

The present invention, too, is directed in its objects to minimization of the consumption of feed, shortening of the time required for sufficient growth of chickens, suppression of variation in the degree and manner of growth of individual chickens and so forth, through reliance on a unique system of raising.

As a desirable house for therein raising a great number of chickens at a same time, a structure is known, which broadly comprises a roof, side walls, ceiling and floor and which essentially is closed. With ordinary open-structure constructions having a constantly open window or windows, various difficulties are encountered. For example, it is difficult with them to control the room temperature of to be even or constant within the house. Also, the lightness within the house can change to a great extent as the time of the day changes, and particularly during the daytime, it is so bright within the house that chickens can be stimulated to take exercise, disadvantageous to the interests of the livestock farmers in a sooner growth of chickens. A further difficulty with those houses having open windows resides in that they can easily permit entry or intrusion of wild animals such as rats, weasels or the like, foreign enemies to chickens. Thus, those constructions are not suitable for the large scale poultry farming or mass raising of poultry under reference.

Then, in the case of a construction having a substantially closed structure, ventilation, temperature control, lighting and so forth are all operated artificially, so that it is feasible to adjust various conditions to optimum ones for poultry raising.

In order to develop an efficient system for promoting the growth of chickens, the poultryman should necessarily have a good knowledge of the nature of poultry, and in this respect, the present inventors have conducted a number of experiments to obtain a variety of data and exerted efforts to determine on the basis of the data obtained optimum conditions under which the growth of poultry can be most efficiently promoted. According to the results obtained from the above, it has been found for example that in accordance with a change in the weekly age of chickens, an optimum room temperature can change: When chickens are younger, the room temperature is required to be higher, which preferably is to be increasingly lower as the chickens grow older. Over a series of experiments in which the floor temperature was variously altered, it also was discovered that poultry have ability to feel the temperature through the plantar skin and behavior to move to a place on the floor having a temperature suited to respective individuals.

It has hitherto been known to keep warm the floor of the chicken-raising house, and in practice it is generally practised to provide a hot water piping beneath the floor and circulate temperature controlled water through the piping. However, with such system of warming the floor, it is unavoidable that a considerable temperature difference occurs in different portions on the floor depending on whether or not the hot-water circulation piping is nearby located, or whether the particular portion lies near the supply end or the discharge end of the piping. Also, likely in this case is choking of the pipe, causative of a serious difference in the temperature distribution. In an extreme instance of variation in the temperature distribution, a great number of chickens would altogether rush to a limited area on the floor where an optimum temperature condition is maintained. Even if death of chickens due to mutual pressing or suffocation, which often occurs then, may be avoided, chickens tend to gather in a line or row along a portion of the embedded hot-water circulation line about which an optimum temperature condition is present, and exert mutual pushing to disadvantageously consume their energy and accordingly undergo a delay in their growth or raise the rate of their demand for feed, that is, the rate of an amount (Kg) of feed to an increase by 1 Kg in the weight of the chicken. A further problem in case of an irregular temperature distribution resides in that fowl droppings are permitted to undergo desication at varied speeds about different portions on the floor, whereby putrefactive fermentation can be caused in a shorter period of time. Also, in anticipation of heat loss during circulation, hot water may be supplied as overheated, and it then is likely that a concrete floor of the house undergoes cracking, resulting in the generation of a hygienically undesirable condition about the house. If the hot water supply or circulation is broken during wintertime, further, likeliness exists that the water remaining in the pipe becomes frozen to destroy the pipe.

Thus, how to evenly control the temperature distribution substantially throughout the whole floor area has long been one of problems awaiting solution in the field of mass-raising of poultry.

In this connection, there has been a proposal made, according to which hot air is sent into the chicken-raising house from the ceiling or side walls thereof. A difficulty indicated of this proposed system for warming the chicken raising room derives from the fact that the system requires fans for forcibly circulating the atmosphere within the room in order to have evenly warmed the atmosphere close to the floor surface in which the chickens live and grow. In this case, to provide fans of a large size within the room or house accompanies generation of noise and vibration, which give rise to stress to chickens being raised and disturbance to their growth as later to be described in greater detail. Also, with circulation of hot air alone, the floor temperature can hardly sufficiently be elevated in comparison to the temperature of the atmosphere, whereby the room condition then presented can be an undesirable one in the light of efficient raising of chickens.

A next subject to be considered in the mass-raising of poultry is concerned with lighting within the poultry house.

The closed-structure construction for raising of poultry to which the present invention pertains has no window for natural lighting, so that without a room lighting system, chickens being raised cannot see the presence of feed. Lighting within the chicken-raising house or room is usually effected by electric lamps suitably hung from the ceiling of the room, and in this connection there exists a few points to be put for consideration: If the lighting fails to evenly be made within the room as a whole, chickens tend to assemble at a brighter lighted point or points where they can better see the presence of grains or other feed, and it then is difficult to carry out an even feeding to the whole of a great number of chickens raised altogether. Further, even if the lighting itself is desirably uniform throughout the room, if the degree of lightness is excessive the chicken can see not only a closest located feeder but also other feeders located in the vicinity thereof and tends to run about from one feeder to another consuming energy.

Accordingly, it also forms an important problem in poultry raising to provide an effective room lighting system with which light can be evenly scattered towards a number of feeders in the room and chickens being raised therein can be thereby prevented from tending to exert energy consumptive running-about.

Then, ventilation is still another subject requiring discussion.

Inasmuch as the house in which chickens are raised according to the present invention comprises a substantially completely closed construction having no constantly open window, it is necessary to provide thereto a system for artificially operating ventilation, and various methods are known in this respect. One of typical examples of the known methods proposes to provide a suction opening in the side wall of one of the longitudinal ends of the closed construction and an exhaust fan to the side wall of the other end to carry out ventilation. According to another example, introduction of outdoor air into the poultry house is made through the ceiling thereof with the discharging of polluted indoor air effected by a fan disposed in a side wall. In a further example, a side wall is provided with a fresh air introduction opening, and the ceiling with an exhaust fan. It also is known to introduce outdoor air through a duct up to the ceiling of the house and effect discharging of polluted air through an exhaust fan provided to a side wall.

Each of those known methods requires the provision of an exhaust fan in the house and cannot avoid the generation of noise due to the operation of the fan and its associated motor. In addition, it is difficult with such known methods to fulfil a regular or uniform ventilation across the whole of the house.

Chickens are highly sensitive to machine noise, and particularly when the fan is put for operation or its rotation velocity is put for a change, they become so excited as to commence running or jumping and, consuming their energy, lower their appetite. Use of an exhaust fan in the housing for poultry farming is disadvantageous also in that it is prone to induce a high wind condition in the house, which is again detrimental to sound or efficient growth of chickens.

It is generally accepted that the required volume of ventilation per chicken (2 Kg in weight) is on the order of 0.28 $m^3$/min., then required is a fairly great ventilation capacity.

With the existing constructions for raising of poultry therein, they normally have such a structure in which the wall member is formed with a constantly open ventilation opening provided in most cases with a wire net covering. Even when ventilation is scarcely required as in winter for example, this structure permits cold outdoor wind to blow into the room to let the temperature control within the room become difficult. In often cases, ventilation openings of the above structure allows entry of insects and even rats or the like into the room. Moreover, whereas the atmosphere within the poultry raising room normally is more or less dusty with barbs and downs of fallen feather and so forth, a forcible ventilation relied on exhaust fans, if operated under such room condition, will readily stir up small fragments or fallen feather, which will become attached onto the members of the fan, to result in lowering of the ventilation efficiency and more of vibration and noise. Also, whereas according to the current system of ventilation it usually is operated to take outdoor air directly into the room, this manner of ventilation can adversely affect the room warming efficiency particularly in winter in cold districts.

Consequently, it also has been an important problem in the art of poultry farming to materialize an improvement which enables ventilation of the construction for chicken raising to be done at a high efficiency, with an enhanced regularity or evenness and at a suppressed noise generation.

Then, in the case of keeping or, more particularly, raising of pigs, except the lighting for the raising house that will not involve a particularly serious problem in this case, a same may be considered as considered above in connection with the instance of chicken raising, provided that the demand for an improvement particularly relating to the ventilation has been stronger in this case than in the case of chicken raising, in reflection of the difference in the waste pigs and chickens respectively discharge.

SUMMARY OF THE INVENTION

An object of the present invention is therefore to provide a livestock house and a method for raising domestic animals and poultry within a reduced period of time for raising, at a lowered rate of feed consumption and of accidental death, and yet with the variation suppressed in the degree of manner of individual growth.

Another object of the invention is to provide an arrangement for and a method of maintaining substantially at a constant temperature the whole of an effective area on the floor of the livestock house so as to allow the livestock being raised to evenly scatter over the effective floor area.

A still another object is to provide an arrangements for and a method of effecting ventilation of the livestock house at a high efficiency without generation of noise.

To attain these and other objects, the present invention proposes in brief as follows:

The method of raising livestock in a substantially closed house, proposed according to the present invention, is characterized broadly in that it includes the steps of heating the house from below its floor and controlling the temperature of the floor to be substantially constant throughout an area thereof effective for the livestock raising, taking outdoor air through a suction opening and delivering it into the house through a duct, and discharging the air within the house through an exhaust as relied on a natural or spontaneous exhaust, whereby noiseless ventilation across the house interior can be effected.

Likewise, the livestock house according to the present invention is characterized in that it broadly includes heat insulating means incorporated in its side wall and/or roof members, a room heating means provided beneath its floor, an air passage for guiding into the house the outdoor air taken in through a suction opening and subjecting the air to heat exchange, a fan and duct for delivering and distributing the outdoor air evenly within the house, and an exhaust window provided to a side wall thereof for natural discharging of air from the house.

BRIEF DESCRIPTION OF THE DRAWINGS

These and other objects, characteristics and advantages of the present invention will become more fully apparent as the following description is read in conjunction with the drawings wherein:

FIG. 3 shows, in enlargement, a section, partly broken away, taken on line I—I of FIG. 1;

FIG. 4 is an enlarged view, showing a portion of FIG. 3;

DETAILED DESCRIPTION OF THE PREFERRED EMBODIMENTS OF THE INVENTION

Figure 1:
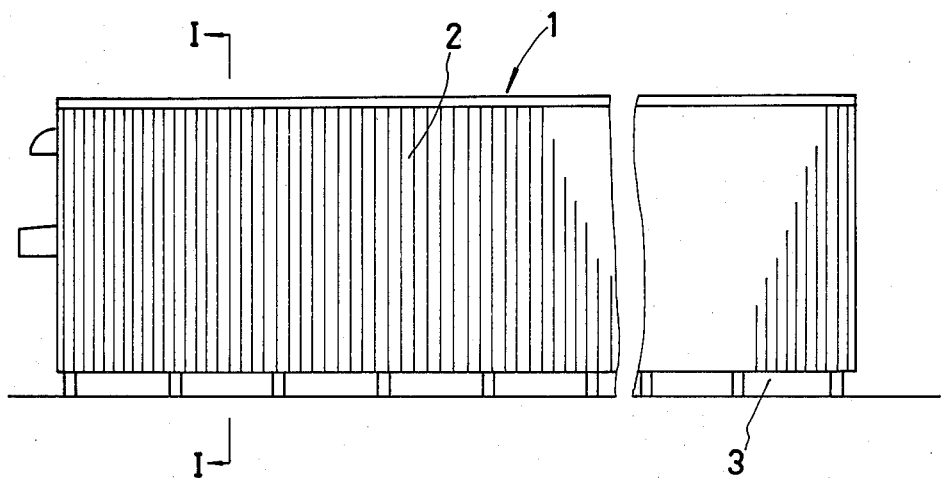
FIG. 1 is a side elevation of a livestock house embodying the concept of the invention.

Referring now to the drawings, as illustrated in FIGS. 1-4 the livestock house generically indicated at 1 may preferably comprise a roof 2, side walls 3, ceiling 4 and floor 5, altogether forming a virtually closed construction. Throughout this specification, a substantially closed construction does not mean a completely closed structure or construction, but means such a one which may include an exhaust window, doorway and other structurally unavoidable openings, and more specifically, it means a structure which at least is devoid of a window or the like which is constantly kept open.

Figure 2:
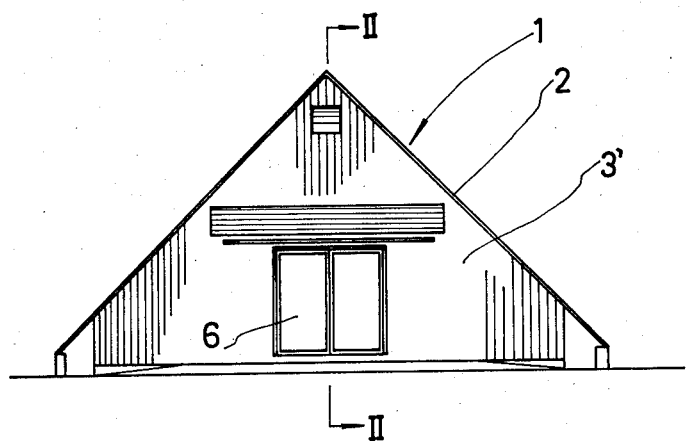
FIG. 2 is a front elevation of the house of FIG. 1.

Regarding the overall configuration of the livestock house 1, although there lies no particular limitation, a gable roof structure as shown in for example FIG. 2 is preferred to ones having a flat or dome roof, and it also is preferred that the lower ends of the roof are extended relatively close to the ground surface, the longitudinal side walls 3 being therefore relatively low in height and elongate in configuration.

The frontage side wall 3' has a doorway 6 normally closed by a door or doors. The ceiling 4 does not necessarily comprise flat plates, and in the illustrated embodiment of the present invention, it is soutilized as to constitute the bottom wall of ducts 7. Normally, the floor 5 may have a solid and relatively rigid outer surface formed with use of mortar or the like, facilitating cleaning operation on the floor surface.

With the livestock house according to the present invention and, more particularly, the house for raising the young of poultry therein, walls 3 and 3' and/or the roof 2 thereof are required to incorporate thermal insulation means as indicated at 8 in FIG. 3 for example. The insulating means 8 is normally disposed between a spaced pair of plates 9 and 9', and in the embodiment of the present invention illustrated in FIG. 3, it comprises vegetable fiber material, which is blown in towards below as shown by an arrow C from a throw-in opening 8' provided at an inner apex portion of the roofing structure. The insulating material 8 blown in through the opening 8' slidably falls between inner and outer plates 9 and 9' to fill the open space along the roof 2 and the side walls 3 and 3' as well.

Material for the heat insulating member 8 may be selected out of rock wool, glass wool, styrene foam and so forth, but it is preferred to use as such material the class of plant fibers of which the heat conductivity is low, a particularly preferred material being papers crushed or broken to flue-like fragments. Broken paper-based material has so high a hygroscopic property that dewing of moisture in air can be prevented from occurring and also it is easy to handle. However, it can catch fire with ease, and should preferably be processed for fire retardation or prevention for example by means of treatment with boric acid and so forth. Thus treated material may be applied by blowing as mentioned above, through a jetting nozzle (not shown). The heat insulator 8 comprising broken paper fragments can also have a sound insulating property. As later to be described in greater detail, it is required for an efficient raising of chickens to keep the chicken house as being prevented from noise, and in this connection, the heat insulator 8 can function to absorb and suppress possible noise of an origin either external or internal to the chicken house.

For the purposes of the present invention, the temperature should be controlled to be virtually even or constant throughout the floor of a chicken house. The term floor herein does not necessarily mean the entire area of the chicken house floor but means such a portion thereof about which chickens are permitted to substantially scatter for the purpose of an efficient raising thereof: If the chicken house has a path for the farmer for example longitudinally across the house, the floor portion corresponding to such path needs not be heated, and a same applies in connection with corner portions of the floor or its such portions as lying extremely close to an edge. Therefore, the term floor may be taken to mean an effective area portion thereof for an efficient promotion of the growth of chickens.

Normally the floor is made of concrete, mortar or the like, but it may be composed of plates of wood, a synthetic resin and so forth.

To maintain the floor surface in an evenly warmed condition, it is required according to the present invention to provide heating means below to floor forming member, which means should most preferably comprise a planar heating device as will later be described. Although it is feasible to dispose below the floor a densely arranged circuit of nichrome wire or piping for heated water circulation, employment of a planar heating device is more preferred because then attainable are a higher heat maintenance effect, higher degree of even heating performance and an economization.

Figure 5:
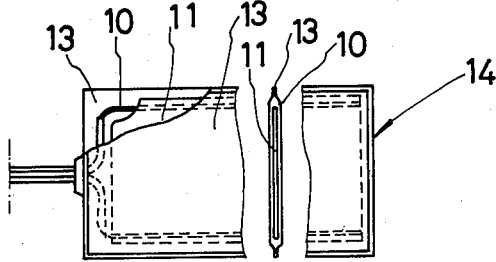
FIG. 5 is a partly broken plan view, showing the detail, partly in section, of a planar heating device to be disposed beneath the house floor according to the invention.
Figure 6:
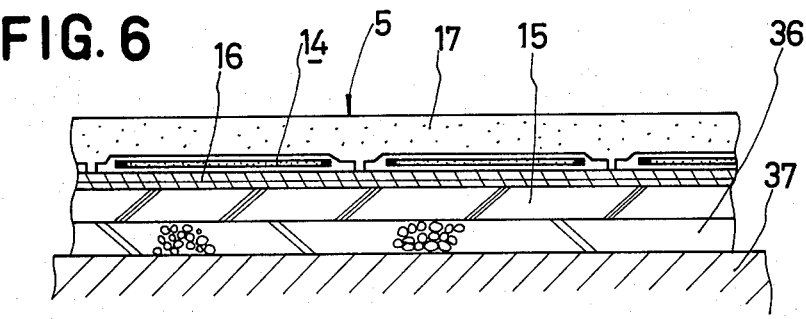
FIG. 6 shows in enlarged section the detail of a floor structure according to the invention.

FIG. 5 shows a plan view of the above-mentioned planar heating device, partly broken away and including a sectional view for illustration of the structure of the device. This heating device, generically indicated by the numeral 14, essentially comprises a planar heat-generating element 11 normally formed from a synthetic resin containing carbon powder admixed therein or of a fabric impregnated or coated with such synthetic resin and having electrodes 10 embedded therein, and a covering 13 of a synthetic resin material enveloping the element 11. A plurality of the heating devices 14 are disposed evenly throughout the chicken house floor 5 as shown in FIG. 6, in which on the ground 37 there is formed a layer of crushed rock or stone 36 overlaid with a concrete layer 15, which in turn is overlayed with a heat insulating plate 16 made of for example gypsum plaster or foam plastic. On the insulation plate 16, planar heating means 14 are disposed regularly side by side, and are coated with an upper layer of mortar 17 forming the floor surface. In comparison to the conventional linear heating system comprising for example a piping for hot water circulation, the planar system relied on the usage of planar heating members according to the present invention can warm and keep warmed the chicken house floor at by far an improved degree of evenness in the temperature distribution.

Whereas the required temperature control may be carried out through any known controller or by way of controlling the electric current across the heating element 11, the range of optimum floor temperature can vary in accordance with degree at which the chickens have grown. Also, although there naturally is a difference present between the temperature of the floor or, more specifically, the floor surface and that of the atmosphere within the chicken house, it normally is preferred to control the floor surface temperature within a range of 30° to 50° C. and the environmental temperature closely above the floor surface within a range of 16° to 40° C. Further, one of the most important characteristics of the present invention consists in maintaining as less as possible a temperature difference in the vicinity of or closely above the floor surface, throughout its wide area, and in greater detail a local temperature difference in a close vicinity of the floor surface should be suppressed preferably below 5° C. and, more preferably, 3° C. In the event of local differences in the temperature distribution above 5° C. in particular, chickens tend to altogether collect at an optimum temperature region of the whole floor area to undergo an accidental death by mutual pressing as before mentioned.

Each planar heating device put for use according to the present invention can keep a certain area of the floor evenly warmed, so that by disposing a plurality of such devices evenly about a whole floor area and practising a normal heating operation with such devices, it is feasible to accordingly evenly warm the whole floor area. When an even or constant warming of the chicken house floor is made as above stated, chickens can tend to evenly scatter over the whole floor area particularly at the time of their sleep, whereby the number of chickens to be raised in a unitary area of the floor can be increased, to result in a more efficient mass-raising of chickens.

As before mentioned, the poultry raising house or chicken house according to the present invention is devoid of a window for natural lighting of the room and the provision of an artificial room lighting system is unavoidable. With the poutry or domestic fowl, it is generally accepted that under a darker condition their eyesight becomes progressively lowered particularly in perceiving a distant object.

Figure 7:
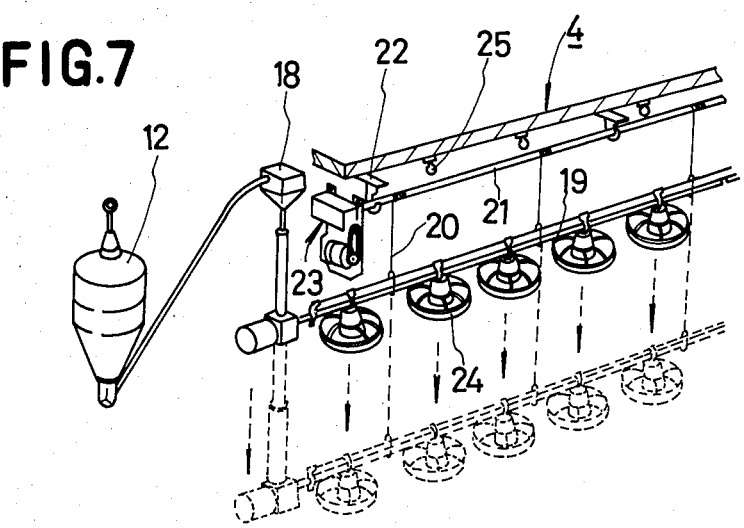
FIG. 7 is a perspective view, illustrating a preferred arrangement for livestock feeding and lighting within the livestock house in accord with the present invention.

FIG. 7 shows a preferred embodiment of the concept of the present invention in respect of the room lighting system in association with a feeding system.

As to the method of feeding chickens, the present invention does not involve a particular limitation, and in predominant cases of mass-raising of chickens it is practised to provide a plurality of feed receptacles or feeders, which individually can feed normally 10 to 20 chickens at the same time, and supply feed into the feeders through a piping connected to a feed reservoir. Feeders may be disposed in a stationary manner or a manner in which they can be lifted toward the ceiling of the house except the time for feeding, as illustrated in FIG. 7.

In FIG. 7, the feed stored in a feed tank 12 is delivered through a hopper 18 and distributed through a pipe 19 to a plurality of feeders 24. The pipe 19 is supported at a number of points along its length in a manner of being suspended through wires 20, which are wound about their respective upper ends about a rotatable shaft 21, which is supported through hooks 22 disposed at intervals along the length of the shaft and, at its one end, connected to a shaft driving motor 23. Upon completion of distribution of feed to respective feeders, the shaft 21 may be driven for rotation by the motor 23 to unwind wires 20 and lower the set of feeders 24 together with pipe 19 closely toward the floor. Then, upon completion of feeding, the rotation shaft 21 may be rotated in the opposite direction lifting the pipe 19 and feed receptacles 24.

In feeding chickens, as the feed containing receptacle 24 is lowered close to the floor, chickens rushes towards the same. In this connection, if the room lighting effected is of a degree exceeding a certain level of brightness, the chicken can see not only nearby located feeders but also such ones as located relatively far distant from it and can therefore be motivated to practise running from one feeder to another and consume energy, disadvantageously to the interests of the chicken farmer. Further, in the event of an irregularity in the distribution of light, for example in case the chicken raising room is brighter at a central region than at the rest region thereof, chickens are prone to rushingly gather about the brighter-lighted central feeders. Thus, in order to let chickens scatter evenly about a number of feeders and carry out an efficient feeding, it is recommended that the lighting is of a degree sufficient to let the chicken see only a closest located feeder or feeders but insufficient to allow the chicken to see distantly located feeders. In this respect, it is not necessarily required to light evenly throughout the whole area of the room floor, and a spot-lighting system may be effectively employed, for example with use of suitably spaced lighting devices such as shown at 25 in FIG. 7. However, as before pointed out, the distribution of light should in this case again involve no local irregularity within the room as a whole. To provide a lighting system as recommended above, even although it depends on the particular interval at which each adjacent feeders are disposed, it may be followed for example that an incardescent lamp of 60 watt is provided in a floor area within a range of 20 to 25 m², at a height of about 2 m from the floor surface.

Figure 8:
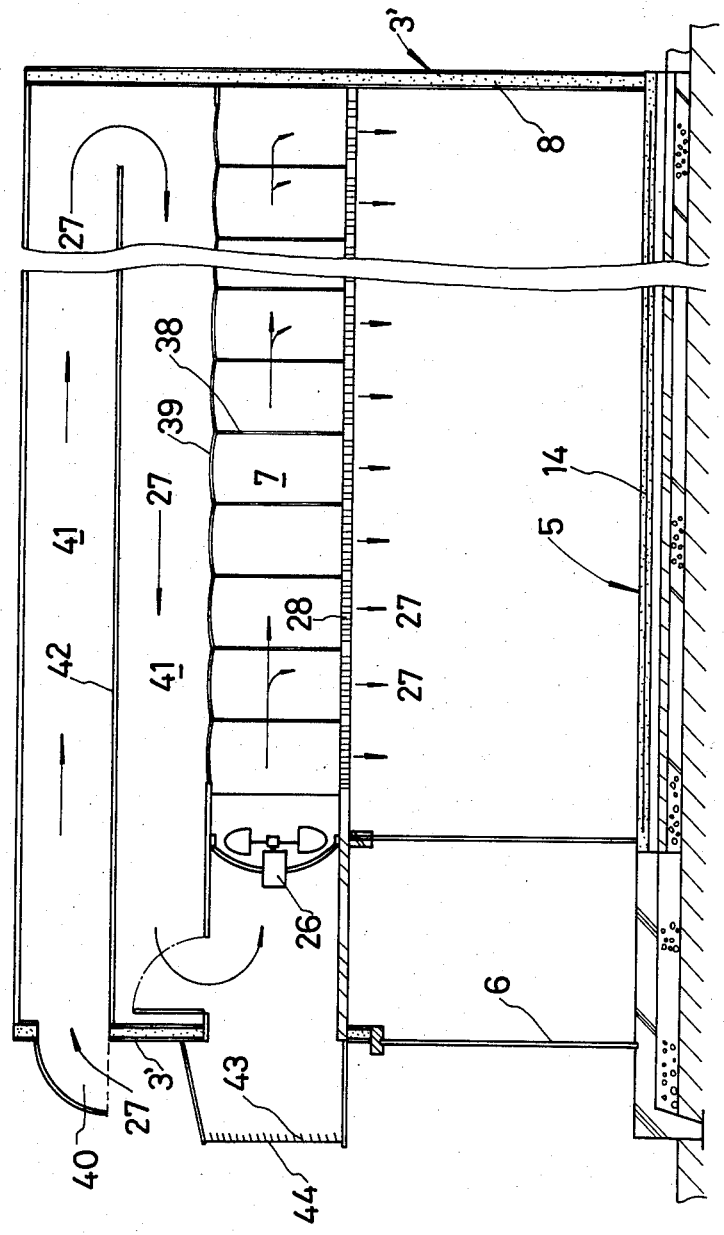
FIG. 8 shows a longitudinal sectional view taken on line II—II of FIG. 2.

The longitudinal sectional view of FIG. 8 is taken for illustration of a preferred system for ventilation according to the present invention, and as illustrated an air guiding fan 26 is disposed at an inlet portion of the duct 7, which is provided in a plural number of rows on the ceiling 4 as shown in FIG. 3. Each duct 7 comprises a tunnel-like structure of an arc in cross section composed of a number of arched wire frames 38 suitably spaced in the longitudinal direction thereof and a covering 39 comprising for example a wind-proof cloth. As before stated, the plate forming the ceiling 4 constitutes the bottom wall of ducts 7, and it is formed with a number of air discharging openings 28, which can be of any suitable shape and arrangement of disposition: For example, a plate having a number of perforation holes may be employed for the ceiling plate to provide the openings 28. In order to have outdoor fresh air 27 be sent out evenly through respective openings, it may preferably be devised to increase the number of the opening 28 per unitary area or the bore size thereof, in proportion to an increase in the distance from the fan 26, and in case the opening is of a closable structure having a covering door, the degree of opening of the door may be adjusted to be greater towards away the fan. According to the present invention, the fresh air 27 introduced through the inlet opening 40 in FIG. 8 is caused to pass through a guide path 41 to then undergo heat exchange with the air already warmed within the chicken house. In winter particularly in nothern districts, the outdoor air is colder than the indoor air, and to introduce outdoor air directly into the chicken raising room means the necessity of not only a larger consumption of energy for the room warming operation and accordingly an economical disadvantage but also a complex operation for the room temperature conditioning. In summer, then the heat exchange can take place in a reverse manner of the outdoor air cooling the indoor air through the passage of the former through the guide path 41, according to the present invention. The method of heat exchange may not be limited only to the one described above and illustrated in FIG. 8, but it is expedient as well as effective to provide a plate diaphragm 42 substantially horizontally extending in the lengthwise direction of the house 1, as shown in FIG. 8. The outdoor air subjected to heat exchange as above may be introduced into the room through discharge holes 28 of ducts 7, and then feeding of fresh air can be made into the chicken house without any adverse effect upon the operation for controlling the room temperature.

In case a positive heat exchange as above is not required, a sheet cover 44 otherwise to be applied over ventilation holes 43 may be removed away to take outdoor air directly through the holes 43.

In the present invention, further, discharging of polluted indoor air is effected without use of a power-driven fan, through a natural exhaust quietly by way of an exhaust window provided to a side wall 3, and in FIGS. 9 through 12 there are illustrated a few examples of the exhaust window according to the present invention.

Figure 9:
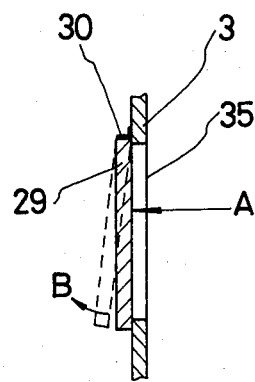
FIG. 9 shows a vertical section of an embodiment on the exhaust window of the invention.

Initially in FIG. 9, which shows the exhaust window 35 provided to the side wall 3 and in closed condition, a window cover plate 29 is secured only at its upper end portion to the wall 3 through a hinge 30, so that it can be driven by a force application in the direction of arrow A to pivotally move in the direction of arrow B with the fulcrum of the hinge 30 as the axis of the pivotal movement, to open the window 35. When the atmospheric pressure within the chicken house becomes raised due to air sent into the room through ducts 7, wind pressure is applied in the direction shown by arrow A to let the window cover plate 29 rotate in the direction shown by arrow B and take the position shown by the dotted phantom line, whereby indoor air can flow out into the air through the gap then produced through the window.

It will be readily noted that the above example of the exhaust system does not make use of a power-driven member and is therefore free of generation of a machine noise. Also, when the amount of air introduced into the room through ducts 7 is relatively small, the plate 29 can little move to open the window 35. Thus, by the provision of the above exhaust window, it is feasible to effect a noiseless exhaustion of air evenly throughout the chicken raising room. At the same time, entry of outdoor light and air into the room can be effectively checked.

Figure 10:
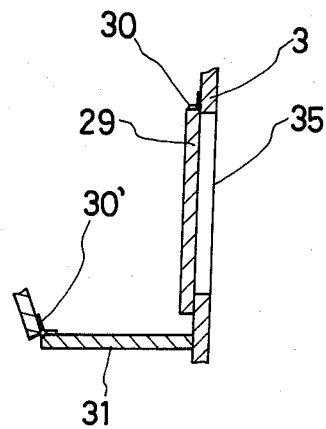
FIG. 10 similarly is a vertical section, showing a further embodiment of the window.

FIG. 10 shows another example of the exhaust window proposed according to the present invention, which incorporates to the above structure of window and its cover plate shown in FIG. 9 a rat preventive plate 31, which is secured to the side wall 3 below the window 35 and has a foldable outer end portion hinged at 30'. The hinge supported end portion of plate 31 can be freely adjusted with respect to its angular position relative to the rest portion of the plate, and the plate 31 can prevent a wild enemy to chickens for example a rat, weasel or else from entering the chicken house through the exhaust window. The plate 31 can also function to shut outdoor light from entering into the room from below the exhaust window 35 when it is opened.

Figure 11:
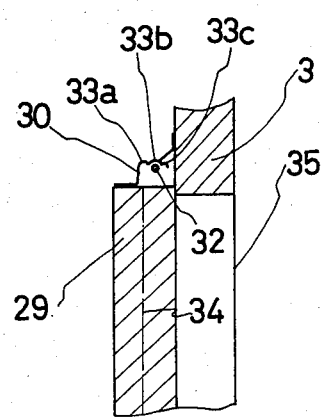
FIG. 11 is also a vertical section, showing a still further embodiment of the window.
Figure 12:
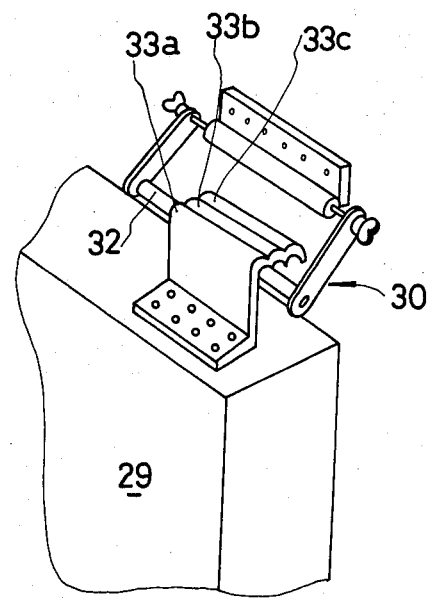
FIG. 12 shows a perspective view, showing in enlargement a portion of the window of FIG. 11.

The illustration in FIG. 11 is taken to show such an aspect of the present invention in which by employing a hinge 30 of a modified structure, an adjustment can be made of the amount of air to be discharged through the window 35 or of the atmospheric pressure within the chicken house, and FIG. 12 shows an enlarged view of such modified hinge 30. With the hinge 30 of this embodiment, a bar member 32 can be engaged with one of hooks 33a, 33b and 33c to have transferred to fulcrum supporting the window cover plate 26. For example, when the bar 32 is engaged with hook 33a, the fulcrum lies right above the line of the center of the thickness of plate 29, so that the plate 29 can be easily caused to move to open the window 35; on the other hand, if the bar is in engagement with hook 33c, then the position of the fulcrum is deviated towards the side wall 3 and the plate 29 cannot with ease be moved. Thus, by employing a hinge of the structure shown in FIGS. 11 and 12 in mounting the plate 29 to the side wall 3, an adjustment can be effected of the amount of indoor air to be discharged.

The exhaust window 35 may be provided preferably to either of the two frontage side wall 3' of the chicken house, and it may be provided in a plurality of numbers, considering the size of the chicken house and the number of chickens to be raised therein. The required ventilation capacity may be changeable depending on the particularity as to the weekly age of chickens, temperature and humidity within the chicken house and so forth, but it normally is on the order of 0,0005–1.0 and, more preferably, 0.001–0.3 $m^3$/min. per chicken.

The ventilation system according to the present invention does not use a power-driven exhaust fan provided in the chicken house, whereby the ventilation is effected in a substantially noiseless manner, without giving rise to stress or tension to chickens being raised. Also, the chicken house according to the invention is effectively insulated from outdoor noise on account of the insulating means applied about the roof and side walls thereof.

Figure 13:
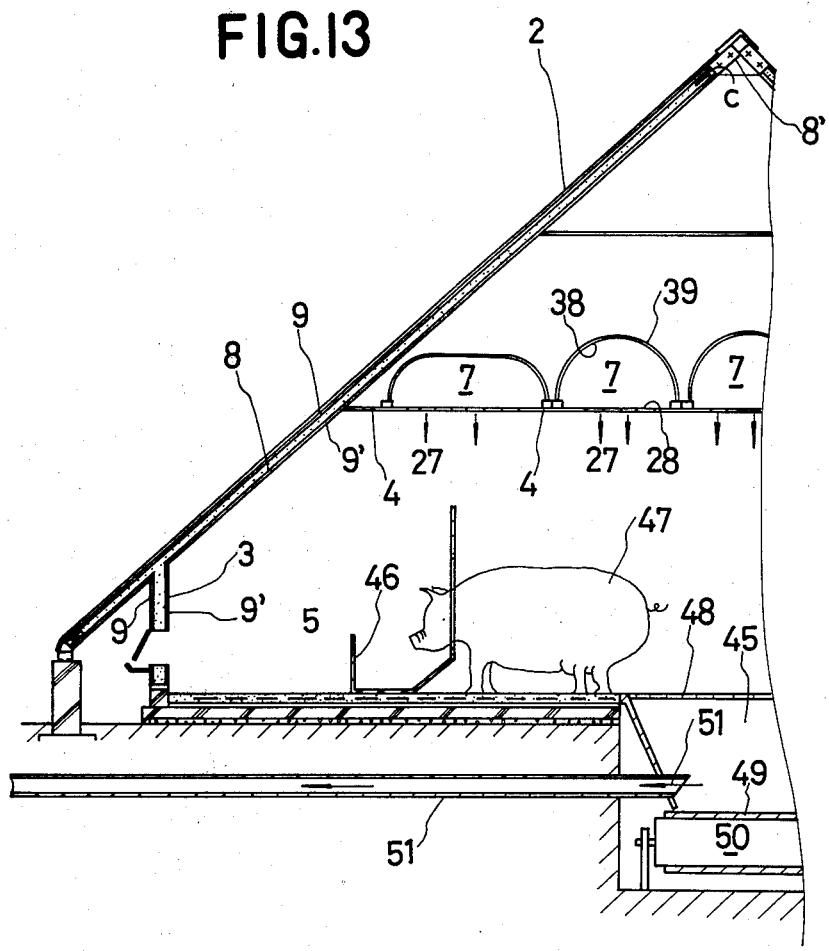
FIG. 13 is a sectional view similar to FIG. 3, showing a portion of the livestock house according to the invention, applied to the raising of pigs.

FIG. 13 illustrates an example of the livestock house according to the present invention, applied in the instance of hog or pig raising.

A point in which the house of FIG. 13 essentially differs from the chicken house of for example FIG. 3 resides in that the former has a pit 45 formed in a central portion of the floor 4. A pig 47 which is illustrated in FIG. 13 as in the course of eating the feed supplied in a feed bin or receptacle 46 has the behavior of discharging waste during eating. A plurality of feed bins 46 may be provided in two rows disposed along the length of pit 45 so that the discharged waste can be received in the pit, over which a covering grille member 48 is provided to prevent pigs from dropping into the pit and of which a bottom wall is formed by a belt conveyor 49 mounted over a plurality of rollers 50. The droppings received on the belt conveyor 49 may be carried to a suitable discharge receptacle such as a tank or the like (not shown). Also, it may be suitably devised to provide an exhaust pipe such as shown by 51 for removal by suction of ordor from within the pig raising house. Although the example illustrated in FIG. 13 provides for the conveyor 49, such conveying means may be dispensed with in case a pit exhaust system such as the pipe 51 is provided for the exhaust system can function to effectively check rotting of the pig ordure.

EXAMPLE

In a gable-roof house including a ceiling, side walls and a floor of the area of 480 $m^2$, 10,000 chickens were raised for a meat market. The atmospheric temperature closely above the floor surface was variously adjusted within a range of 40°–18° C. in accordance with the progress in the weekly age of chickens. Ventilation of the house was made by introducing outdoor air by a suction fan through a duct into the house and discharging indoor air by natural exhaustion through an exhaust window of the type shown in FIG. 10. The duct was of a structure in which air discharging openings are increased in number towards deeper away the suction fan so that in all portions along the length of the duct constant amounts of air can be sent into the house. The rate of ventilation was adjusted within a range of 70–200 $m^3$/min. in accordance with the progress in the weekly age of chickens. Planar heating means were disposed below a mortar floor surface, and heat insulating means comprising broken paper fragments were applied about the area of the roof and side walls. Differences in the temperature distribution were measured on various points on the floor surface to find as being within a range below 3° C. The lighting within the house was effected by 60-watt incandenscent lamps disposed at the height of 2 m from the floor surface, one for each 25 $m^2$ of the floor area. Feeding is made by automatically distributing the feed through a pipe to circular dish-like feeders of a diameter of about 30 cm. The feeders were so arranged as to be lifted except for the time of feeding.

Raising was initiated of chickens one day old after hatching, 40 g in average weight. It was determined that chickens scattered evenly about all the feeders at the time of feeding and evenly about the whole area on the floor at the time of sleep. Also, as a result of sampling tests, it was further found that the variation in the degree and manner of growth of individual chickens was within a range of 5%. The rate of survival of chickens was so high as to be 99.75%.

CONTROL EXAMPLE

In a house having the floor area of 500 $m^2$ and a constantly open window in a side wall, 7,000 chickens were raised. Warming of the floor surface was effected by circulating heated water through a piping disposed below the floor, and ventilation, by providing an exhaust hole forming an air passage through the ceiling towards the roof and by rotating an associated exhaust fan. The atmospheric temperature closely above the floor surface was maintained within a range of 30°–20° C. average, but there were determined temperature differences of about 10° C. between portions on the floor having the hot water piping in the vicinity thereof and other portions.

Rasing was initiated also of chickens one-day old after hatch, 40 g in average weight. It was frequently observed that during the daytime chickens ran around the constantly open window, which permits entry of outdoor light. Also, chickens tended to assemble in lines along the sections of the hot water piping. The variation in the growth of individual chickens was 7%, and the rate of survival of chickens was so low as to be 95.8%. Main causes of the low rate of survival or high rate of death of chickens were that a great number of chickens gathered at a point on the floor at a sametime and that weasels were permitted to enter the chicken house through the permanently open window.

Figure 14:
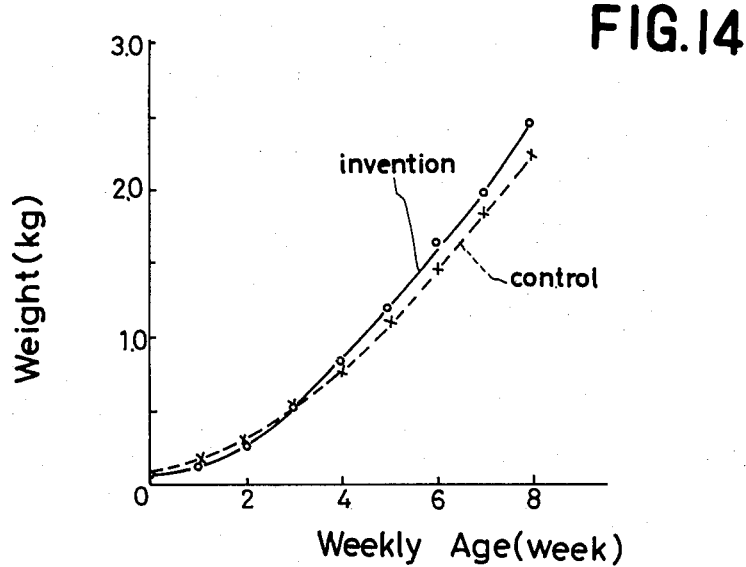
FIG. 14 shows a graph, illustrating a comparison between the present invention and a control, of data found on promotion of growth of chickens.
Figure 15:
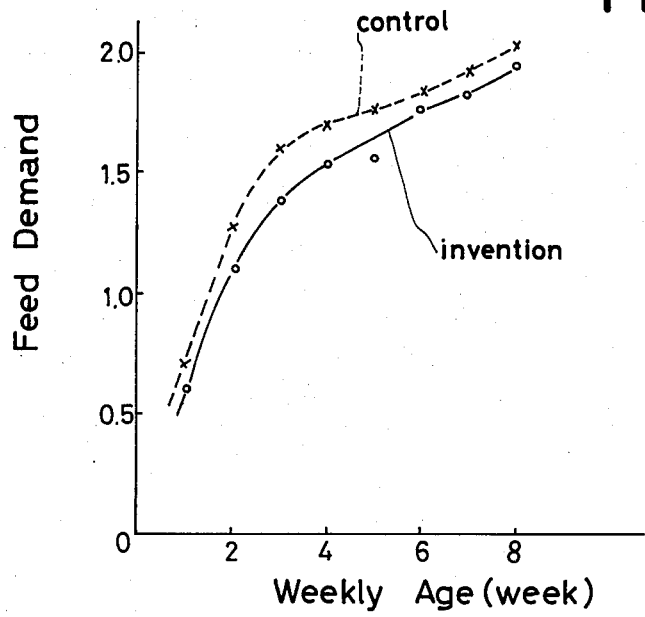
FIG. 15 shows a graph similar to FIG. 14, illustrating a comparison between the present invention and a control, of data found on the rate of chicken's demand for feed.

FIGS. 14 and 15 are taken for comparison of the Example of the present invention and the Control Example above, with respect to data found of the rate of growth in weight (FIG. 14) and those found of the rate of feed demand (FIG. 15), proportional to the lapse of weekly ages of chickens. In the graphs of FIGS. 14 and 15, the solid line represents the Example of the present invention, the broken line representing the Control Example.

What is claimed is:

1. A substantially closed livestock house comprising roof, ceiling, floor and side walls, which includes:
   a heat insulating member applied about the roof and side walls comprising broken paper fragments processed for fire retardation;
   a planar heating device disposed below the floor comprising a planar heat-generating element made of a plate of a synthetic resin containing carbon powder mixed therein or a fabric coated on impregnated with such synthetic powder, a pair of electrodes and a covering member;
   an air inlet opening in one of the side walls near the uppermost portion of the side wall;
   a fan arranged to pull outside air into the house and distribute it within the house;
   at least one exhaust window in at least one side wall for effecting natural exhaust of air;
   at least one duct formed with the ceiling as a bottom side, with the bottom side having a plurality of openings, the duct being arranged on the downstream side of the fan to receive the outside air pulled into the house by the fan;
   a guide path between the air inlet and the fan for heat exchange of the outside air pulled in by the fan comprising a plate diaphragm horizontally extending longitudinally of the house so as to form an at least two-pass labyrinth from the air inlet to the fan extending the length of the house; and
   one cover plate pivotally covering each exhaust window adapted to open the exhaust window responsive to a rise in the pressure in the house.

2. A substantially closed livestock house comprising roof, ceiling, floor and side walls, which includes:
   a heat insulating member applied about the roof and side walls;
   a planar heating device disposed below the floor;
   an air inlet opening in one of the side walls near the uppermost portion of the side wall;
   a fan arranged to pull outside air into the house and distribute it within the house;
   at least one exhaust window in at least one side wall for effecting natural exhaust of air;
   at least one duct formed with the ceiling as a bottom side, with the bottom side having a plurality of openings, the duct being arranged on the downstream side of the fan to receive the outside air pulled into the house by the fan;
   a guide path between the air inlet and the fan for heat exchange of the outside air pulled in by the fan comprising a plate diaphragm horizontally extending longitudinally of the house so as to form an at least two-pass labyrinth from the air inlet to the fan extending the length of the house; and
   one cover plate pivotally covering each exhaust window adapted to open the exhaust window responsive to a rise in the pressure in the house.

3. A livestock house as claimed in claim 2, in which the planar heating device comprises a planar heat-generating element made of a plate of a synthetic resin containing carbon powder mixed therein or a fabric coated or impregnated with such synthetic resin, a pair of electrodes and a covering member.

4. A livestock house as claimed in claim 2, in which the heat insulating member comprises broken paper fragments processed for fire retardation.

5. A livestock house as claimed in claim one of claims 1 or 2, which has a pit provided in a central portion of the floor, extending in the longitudinal direction thereof.

6. A livestock house as claimed in claim 5, in which a exhaust pipe is provided to the pit, communicating with the air.

* * * * *